Figure 1:
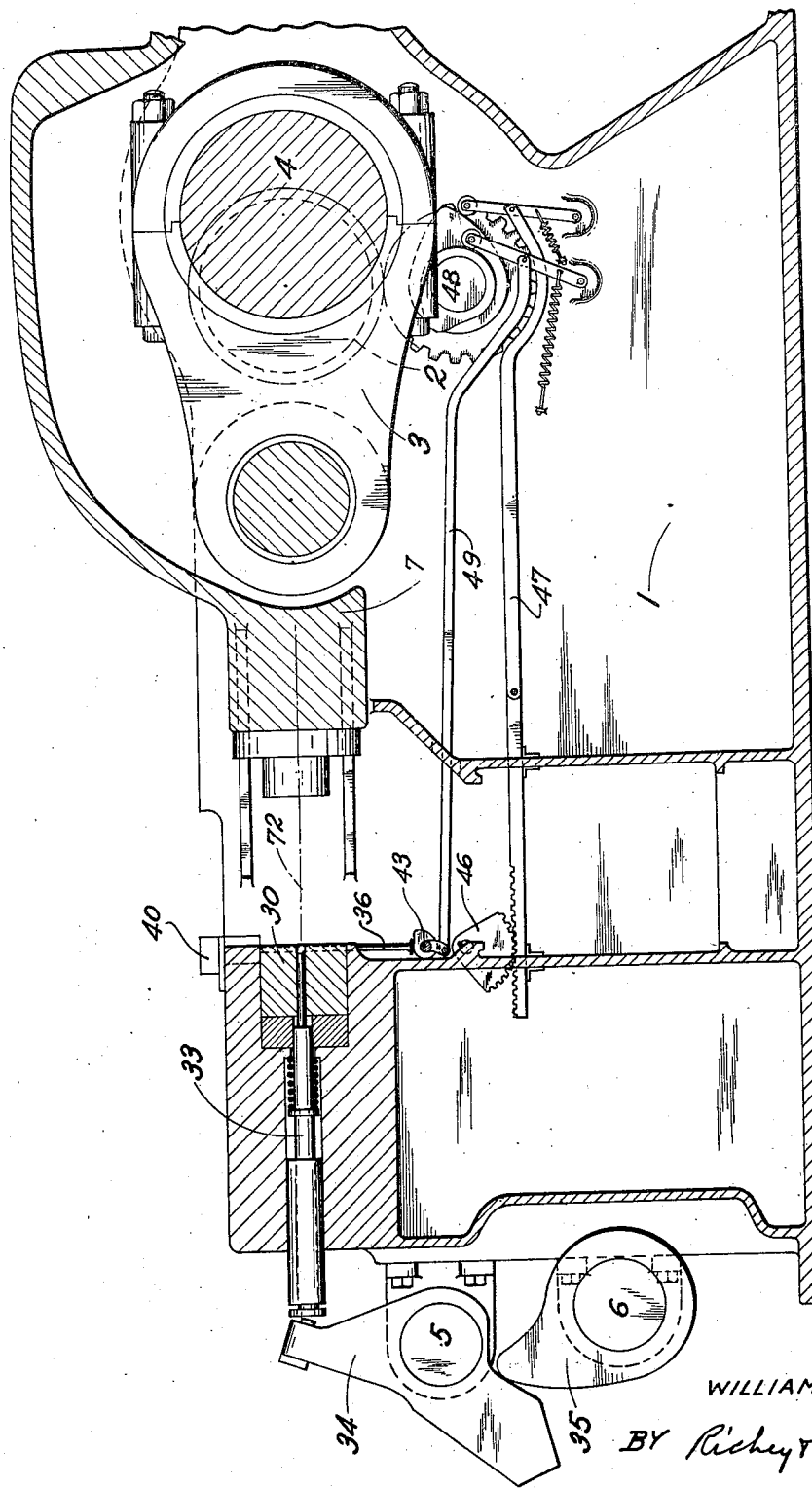

Dec. 13, 1938.  W. L. CLOUSE  2,139,936
MACHINE FOR MAKING BOLTS
Filed March 31, 1937   5 Sheets-Sheet 3

INVENTOR.
WILLIAM L. CLOUSE
BY
Richey & Watts
ATTORNEYS

Dec. 13, 1938.   W. L. CLOUSE   2,139,936
MACHINE FOR MAKING BOLTS
Filed March 31, 1937   5 Sheets-Sheet 4

INVENTOR.
WILLIAM L. CLOUSE
BY
Richey & Watts
ATTORNEYS

Dec. 13, 1938.   W. L. CLOUSE   2,139,936
MACHINE FOR MAKING BOLTS
Filed March 31, 1937   5 Sheets-Sheet 5
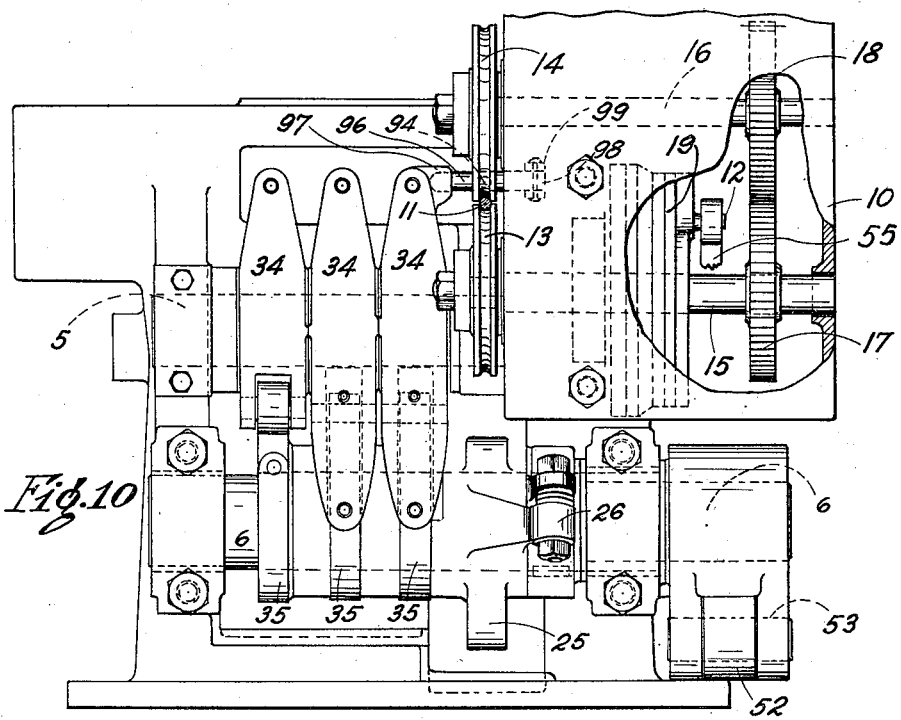
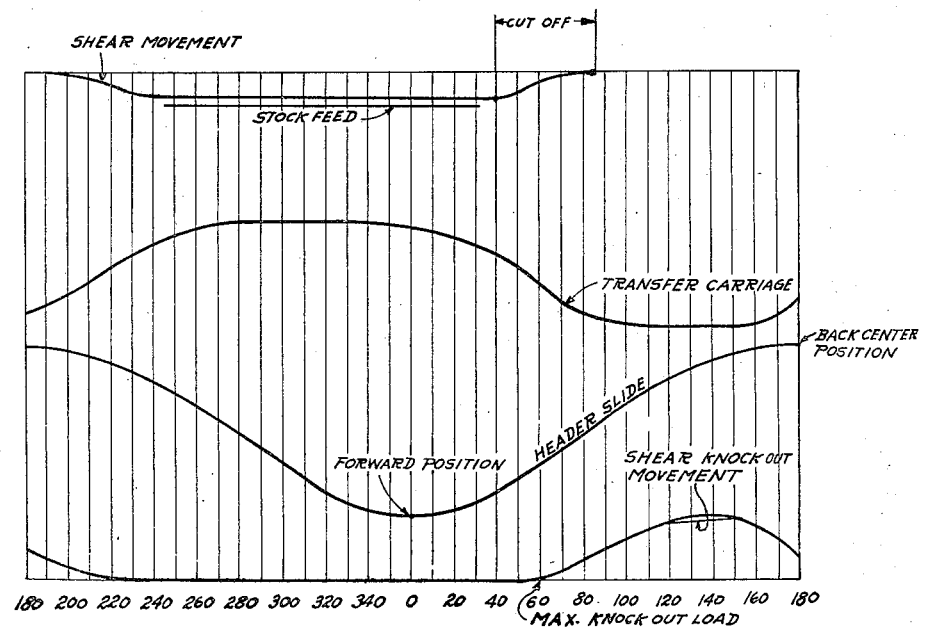
Fig.11
INVENTOR.
WILLIAM L. CLOUSE
BY
Richey & Watts
ATTORNEYS Patented Dec. 13, 1938

2,139,936

UNITED STATES PATENT OFFICE 2,139,936

MACHINE FOR MAKING BOLTS

William L. Clouse, Tiffin, Ohio, assignor to The National Machinery Company, Tiffin, Ohio, a corporation of Ohio Application March 31, 1937, Serial No. 134,057

42 Claims. (Cl. 10—12)

This invention relates to machines for making bolts or like headed articles and more particularly relates to combined machines designed to effect successive fabricating operations upon a series of blanks such as, for instance, shearing the blank from rod stock and/or extruding and/or heading. The present invention is particularly well suited for use in combined machines of the type disclosed in the patent to Frost No. 2,020,658 of November 12, 1935, although it will be understood as the description proceeds that the invention is useful in machines which do not include a pointer mechanism and roll threading mechanism such as the machine of said patent.

Figure 2:
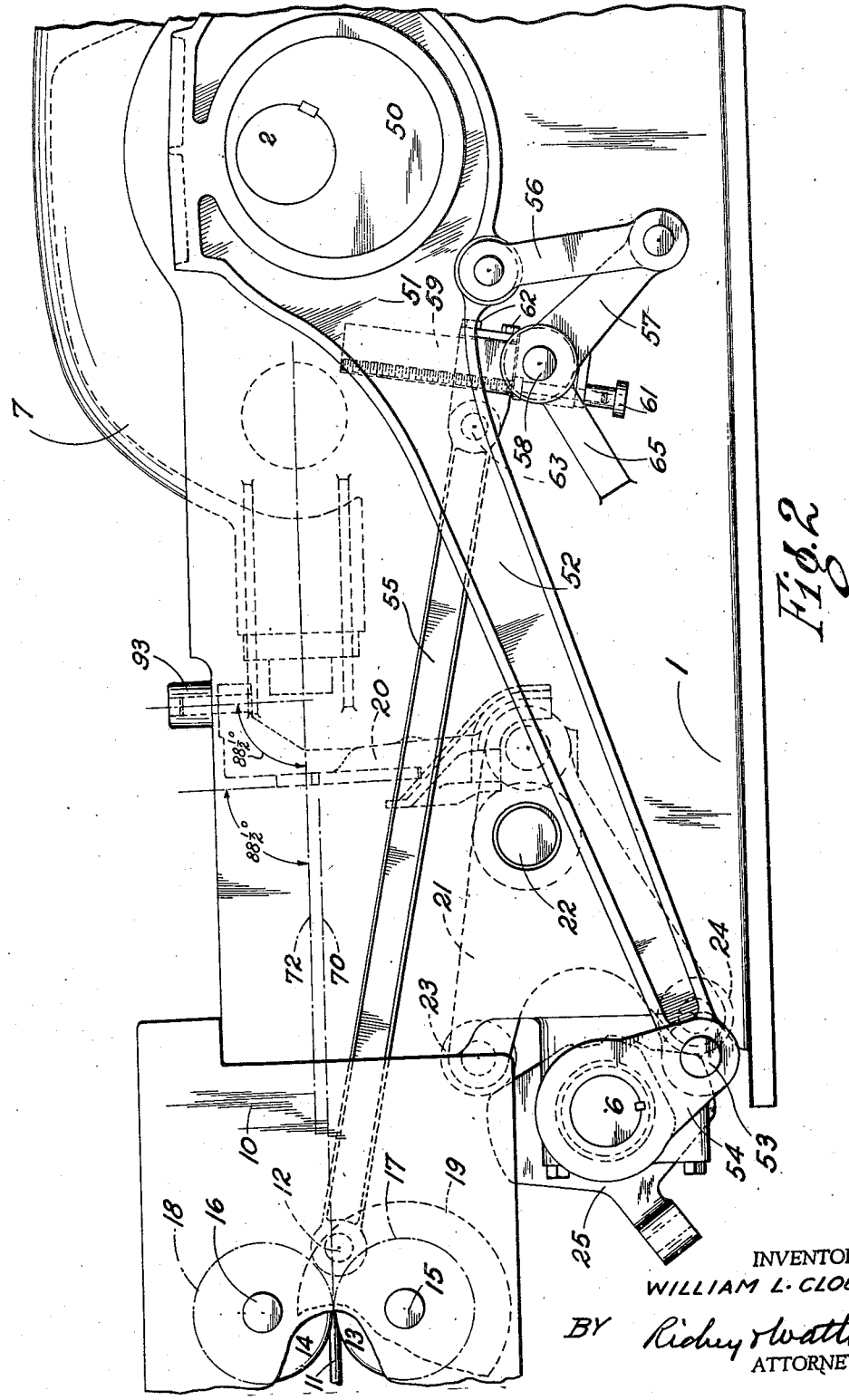
Figure 3:
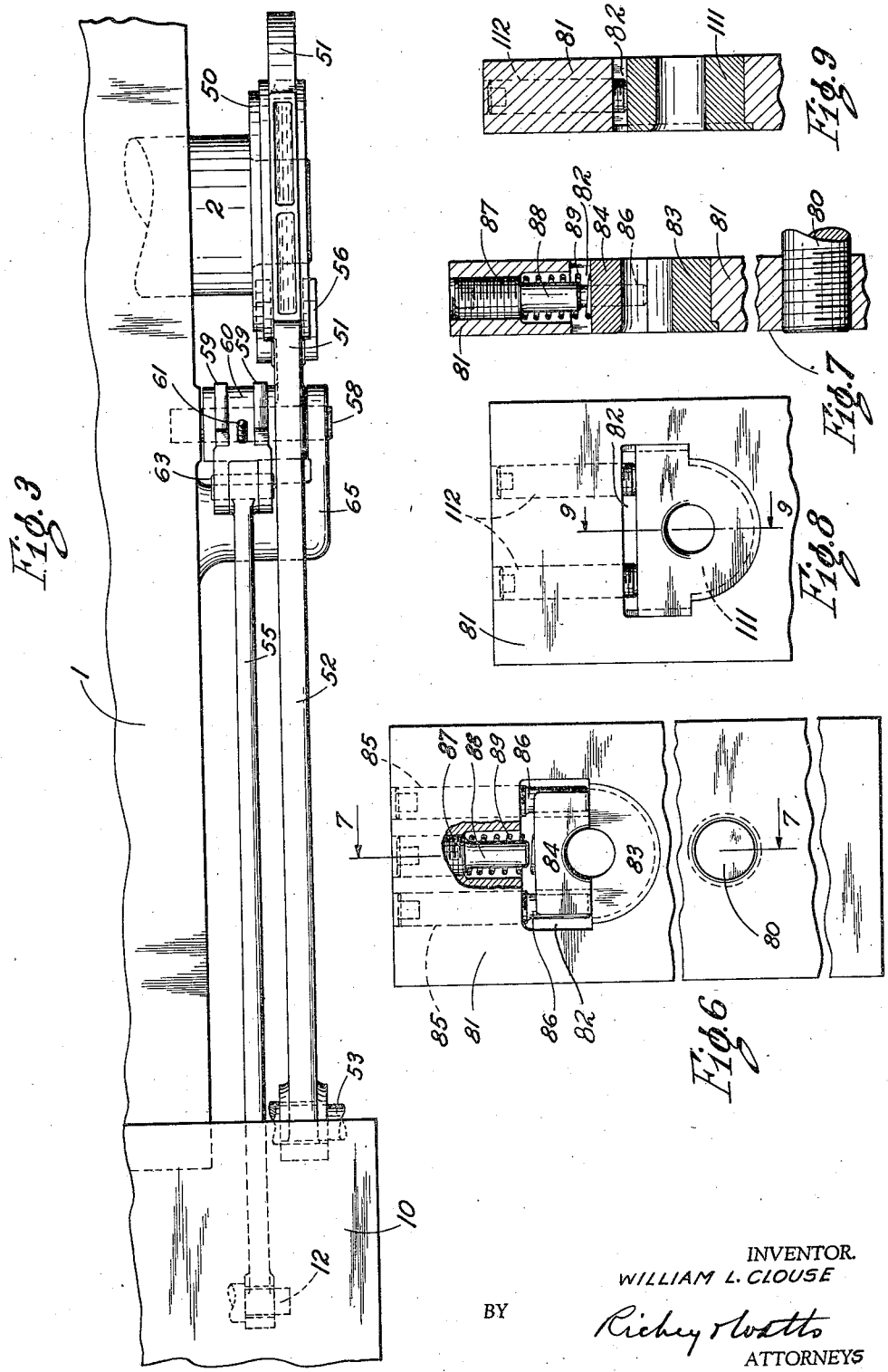
Figure 4:
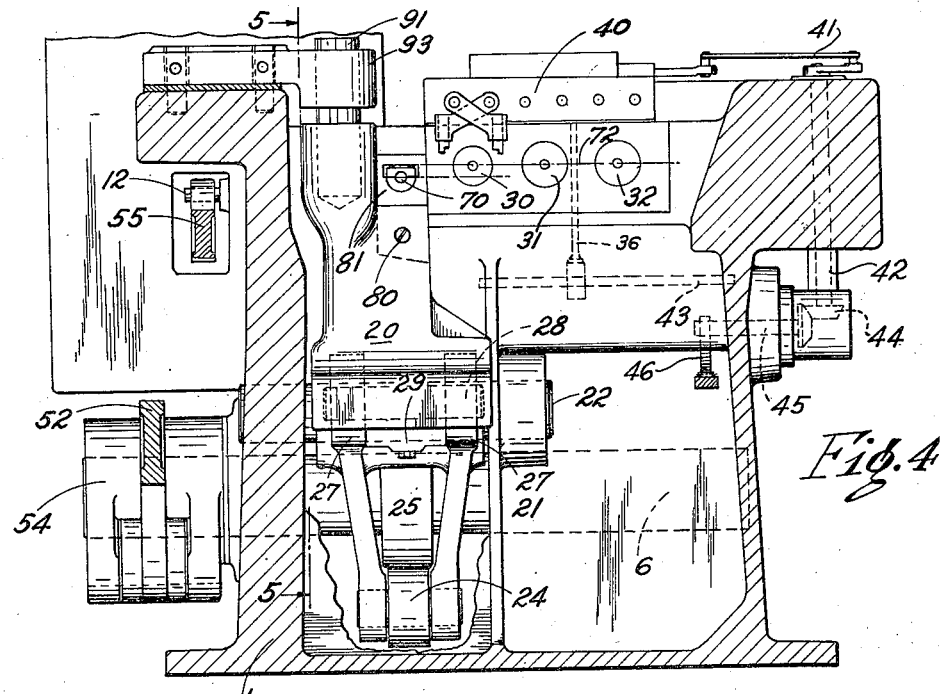
Figure 5:
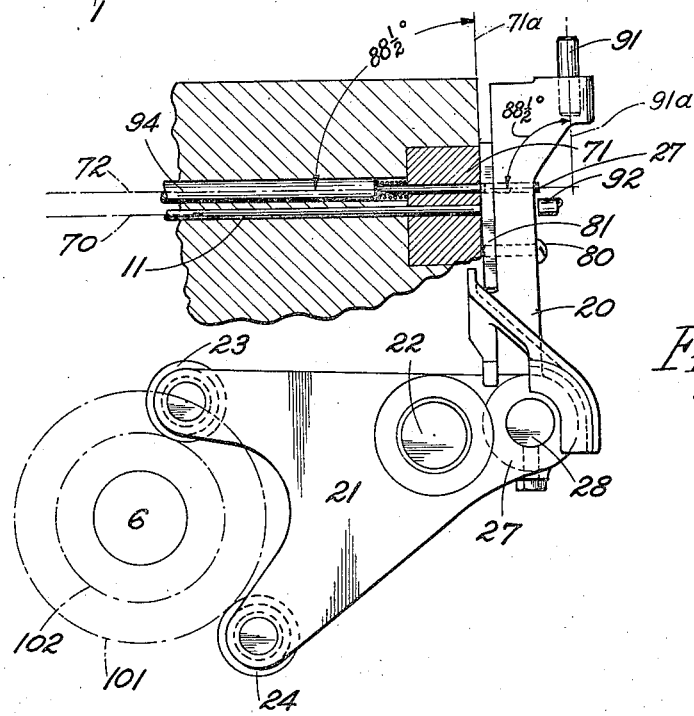

It is among the objects of my invention to provide a machine of the type referred to in which the construction and arrangement of the moving parts results in a strong, simple machine which is reliable and efficient in operation and a machine which presents marked economies of manufacture. It is also among the objects of my invention to provide a machine of the type referred to in which the members employed to transmit the feed, shearing and knockout loads from the main crankshaft to the feeding, shearing and knockout mechanisms are constructed and arranged to more efficiently and economically accomplish the functions for which they are designed. It is a further object of my invention to provide a machine of the character referred to in which the bed frame of the machine, the feed, shear and knockout mechanisms are combined in a manner operating to effect a more efficient distribution of the weight and an improved structural relation between said parts which results in considerable savings in the cost of manufacture of the machine. It is a further object of my invention to provide a machine of the character referred to with an improved, efficient shear arrangement. It is a further object of my invention to provide a shear in accordance with the preceding object in which the shearing parts move through a very short distance and wherein the blank transferring functions delegated to the shearing mechanism according to prior art constructions are accomplished by a separate transferring mechanism. It is a further object of my invention to provide a shearing mechanism in accordance with the preceding object in which the shear parts may be relatively massive and move but a relatively short distance to accomplish their shearing function. It is a further object of my invention to provide an improved shear blade structure which will cut uniformly sheared blanks with end faces substantially normal to the axis of the blank and in which the end faces are free of leaves or laminations. It is a further object of my invention to provide a combined shear and knockout mechanism in which the shearing movement of the shear blade carries a sheared blank into a position to be moved out of the shear by a knockout. It is a further object of my invention to provide a combined shear, knockout and transfer mechanism in which the sheared blank is moved into a position to be moved out of the shear by a knockout and into a pair of transfer fingers in a manner which permits a faster, more efficient operation of machines of the character referred to. It is a further object of my invention to provide a machine of the character above referred to with a shearing mechanism in which the shearing force is applied in a manner whereby a component of the shearing force accurately positions and guides the shearing blade. It is a further object of my invention to provide a shearing mechanism in accordance with the preceding object in which the shear blade moves at an angle other than a right angle with respect to the longitudinal axis of the incoming rod or wire stock so that the "drag" characteristic of the shearing is compensated for. More specifically it is an object of my invention to provide a machine of the character described in which a stock feeding die and a fabricating die are spaced from each other and sheared blanks are moved a part of the distance from the stock feeding die to the fabricating die by a shear blade which moves in a direction other than normal to the axis of the stock feeding die and the sheared blank is moved the balance of the distance to the fabricating die by a transfer mechanism which moves normal to the axis of the stock feeding die. Further objects and advantages relating to simplicity and economies of manufacture will appear from the following description and the appended drawings in which:

Figure 1 is a longitudinal sectional view through a machine embodying my invention; Figure 2 is a side elevation with parts broken away of a machine embodying my invention; Figure 3 is a partial plan view of machine parts shown in the side elevation of Figure 2; Figure 4 is a transverse sectional view looking forwardly of the machine; Figure 5 is a side elevation (with parts broken away) of the shear or cutter mechanism; Figure 6 is an elevation of a preferred form of shear blade suited for use in the shear mechanism of Figure 5; Figure 7 is a sectional view of the cutter blade of Figure 6 taken along line 7—7 of Figure 6; Figure 8 is an elevation of a modified form of shear blade; Figure 9 is a sectional view taken along the line 9—9 of the blade of Figure 8; Figure 10 is an elevation of the front end of a machine constructed according to my invention; Figure 11 is a timing diagram which illustrates the timed relation between various parts of the machine in an operative embodiment of my invention.

I have illustrated my invention in the environment of a bolt making machine which includes in the order in which they operate on the rod or wire stock, a stock feed mechanism 10, a shearing mechanism 20, a plurality of aligned dies 30—31—32 and a transfer mechanism 40 arranged to carry the sheared blank from the shear mechanism successively through the blank working dies. The mechanisms just referred to are mounted upon a bed frame 1, and in a general sense are actuated by a main crankshaft 2 which is arranged transversely of the bed frame. The specific details of the stock feeding mechanism 10 which is arranged at the front end of the machine and is adapted to advance the wire or rod stock 11 forwardly therethrough into the shearing mechanism 20 in properly timed and accurately measured increments do not in themselves constitute a part of my invention other than that the stock feeding mechanism enters into the combination, and thus may be of any commercial type which may be adjusted to feed the stock as described.

The specific details of the transferring mechanism indicated generally at 40 (in Figure 4) do not form an essential part of my invention and various forms of transfer may be employed in this connection to transfer the sheared blanks successively through the series of fabricating dies 30—31—32. The transfer I have illustrated, however, is one shown in detail in the patent to Clouse No. 2,026,823 of January 7, 1936, and is one particularly well suited to this type of work in that it accurately and positively transfers the blanks from one station to another even when operated at a high rate of speed.

The bed frame 1 which is preferably a massive unitary cast structure is provided with a header slide 7 which is reciprocated in suitably formed guideways or bearings in the bed frame by a pitman 3 and crank 4 carried by the main crankshaft of the machine. During each reciprocation of the header slide, the tools carried thereby co-operate with the dies 30—31—32 in the bed frame to effect the desired fabricating operations upon the sheared blanks. Each of the dies 30—31—32 is provided with knockout assemblies which operate in timed relation to the header slide and eject the worked blanks in a manner which will be understood by those skilled in the art. The knockout assemblies indicated generally at 33 are advanced into the dies by suitably formed knockout cams 34 mounted on the knockout shaft 5 journalled at the front end of the bed frame. The knockout cams 34 are in turn actuated in properly timed relation by a series of cams 35 carried by the camshaft 6 also journalled at the forward end of the bed frame.

Although I have illustrated a machine with three spaced fabricating dies, it will be understood as the description proceeds that a machine having only one or two fabricating dies may well embody my invention. In the machine shown in the drawings the worked blanks may be ejected into a trimming die or a storage hopper from the last die (32) of the series. Reference is again made to the patent to Frost No. 2,020,658 which illustrates one method of disposing of the blanks subsequent to their working in the last die of the series.

On that side of the machine shown in Figure 2 which will hereafter be referred to as the right side of the machine, because of its relation to the machine operator, the crankshaft 2 projects beyond the side wall of the bed frame 1 and carries thereat an eccentric 50 which in turn carries a strap 51 integrally formed with a knockout connecting rod 52. The knockout connecting rod 52 extends forwardly from its connection with the crankshaft and is pivoted at its forward end as at 53 to a crank 54 which is secured to the cam shaft 6 journalled transversely at the front end of the machine.

The strap 51 is also arranged to drive the feed connecting rod 55 and to accomplish this function the strap 51 carries a pivoted link 56 arranged to actuate a bell crank having arms 57 and a pair of spaced parallel arms 59 (see Figure 3), said bell crank being rotatably mounted on a bed frame carried bracket 65 and pin 58. The connection between the arms 59 of the bell crank and the feed connecting rod 55 is made adjustable so as to effect a variation in the length of stock fed forwardly into the machine through the feed mechanism. The adjustable connection is obtained by mounting a slide 60 between the opposed flat faces of arms 59 which slide is controlled in its position along the arms 59 by the adjusting screw 61. Bolts 62 are carried by a retaining cap on the slide 60 and clamp the cap and slide in position on the arms 59 when the desired adjustment has been effected through screw 61. The slide 60 carries a pin 63 to establish a pivotal connection with the end of the feed connecting rod 55.

The forward end of the feed connecting rod 55 extends through an aperture formed in the rear wall of the box enclosing the feed mechanism 10 and is journalled within said feed box on a pin 12 carried by the stock feeding mechanism. Although as indicated above various feed mechanisms may be employed in the assembly shown the particular feed mechanism of this embodiment of my invention (see Figures 2 and 10) comprises a pair of co-operating feed rolls 13 and 14 which are suitably grooved to engage and grip the rod or wire stock 11. The feed rolls 13 and 14 are mounted on shafts 15 and 16 respectively, and are geared to each other through intermeshing gears 17 and 18 carried thereby. The lower shaft 15 carries an overrunning clutch mechanism indicated at 19 and through the pin 12 carried on the overrunning clutch 19 translates the reciprocation of the feed connecting rod 55 to rotary motion in the shaft 15. It will be understood that by adjusting the screw 61 at the crankshaft end of the feed connecting rod 55 the stroke of the connecting rod may be varied and hence the angular rotation imparted to shaft 15 varied and the amount of stock fed into the shear controlled.

The shear mechanism indicated generally at 20 is reciprocated vertically by a yoke lever 21 which is pivotally supported on a short transverse shaft 22 carried by the bed frame. The forward end of the lever 21 carries on the spaced arms thereof a pair of rollers 23 and 24 arranged to bear against a shear cam 25 secured through the safety bolt connection 26 to the cam shaft 6. The rear end of the lever 21 carries spaced aligned bearings 27 and through the medium of said bearings, pin 28, and the bearing 29, formed at the lower end of the shear blade assembly 20, is connected to the shear blade assembly 20. It will be observed that as the cam shaft 6 is oscillated by the knockout connecting rod 52 the cam 25 carried thereby will rock the forward end of the lever 21 and effect a vertical reciprocation of the shear blade assembly 20.

The safety bolt drive connection 26 is effected by securing a collar to the shaft 6 by a key or the like and providing said collar with a bolt carrying boss. The cam 25 is free to rotate with respect to the shaft 6 except when connected through the safety bolt assembly 26. The cam 25 is provided with an offset boss similar to the boss on the cam shaft collar and a breakable bolt is passed through aligned boss apertures to secure the collar and cam to each other. In the event of an overload or jam at any point in the shear mechanism the force of drive will break the bolt and thus protect the entire shear assembly.

Referring particularly to Figures 2 and 5 the line 70 indicates the line of feed through the stock feeding mechanism 10 and through the stock feeding die 71 in the bed frame. The line 72 indicates a horizontal plane which passes through the dies 30—31—32 or the plane to which the blank is raised when the shear means 20 has reached the high point in its vertical reciprocation.

The shear 20 has suitably secured thereto through means 80 or the like a shear plate 81, shown in detail in Figures 6 to 9. The plate 81 is apertured at its upper end to receive a shearing quill which may be solid as in Figures 8 and 9 or comprise complementary halves 83 and 84 as in the preferred embodiment of Figures 6 and 7. The lower half 83 of said shearing or cutting quill according to the preferred embodiment is rigidly secured to the plate 81 and the upper half is mounted to permit a limited movement thereof with respect to the plate. A pair of spaced screws 85 with reduced shank portions 86 extend downwardly through the shear or cutter plate 81 and through spaced apertures in the movable quill member 84. The reduced shank members 86 are proportioned with respect to the openings therefor in member 84 to permit a vertical movement of the quill member 84 within the aperture 82. A centrally arranged bolt or screw 87 having a reduced shank portion 88 extends downwardly through the shear plate 81 intermediate the bolts or screws 85. The screw 87 does not extend into the quill member 84, however, but terminates thereabove in shank 88 for a purpose hereinafter described.

A coil spring 89 surrounds the reduced shank portion 88 of the screw 87 and bears at its lowermost end against the quill block 84 in a manner which resiliently urges the upper quill block 84 downwardly against the rigid part 83 of the quill. It will be observed that by adjusting the screw 87 the movement of the quill part 84 away from the part 83 is controlled or limited and that the spring 89 will constantly urge the quill parts toward each other to resiliently grip a blank subsequent to the shearing of the same from the rod or wire stock.

That form of shearing or cutting quill shown in Figures 8 and 9 may be well suited for use with rod or wire stock having certain size, shearing or breaking characteristics and comprises a solid or unitary die 111 which is secured within the apertured blade 81 by screws or bolts 112. It will be understood that this form of shearing quill distinguishes from the preferred embodiment in that the top and bottom halves of the quill are integrally formed and that there is no movement between the parts which embrace the stock and accomplish the shearing.

The shearing mechanism indicated in its entirety at 20 is arranged to reciprocate in a vertical plane longitudinally of the machine and is slightly tilted in said vertical plane toward the feed or stock entrance die 71. Referring particularly to Figure 5 it will be observed that the upper portion of the face of the feed die is bevelled slightly so that the plane of said face as indicated at 71a is about 88½° from the horizontal plane indicated by lines 70 or 72. The shear mechanism 20 is reciprocated along the face of the feed die in the plane 71a by means of the lever 21 arranged to oscillate upon the bed frame shaft 22 in response to the throw of cam 25. It will be observed that the pin 28 which secures the lever 21 and the shearing mechanism to each other is offset with respect to the plane 71a and thus a shearing force applied through 20 by the pin 28 has a horizontal component acting to maintain the shear blade 81 against the face of the stock feed die 71.

Additional means to insure a maintenance of the shear blade 81 against the stock feed die is provided by the guide pin 91 which projects upwardly from the shear mechanism and is received by a guide bushing 93 projecting laterally from the bed frame (see Figures 2 and 4). The axis of the guide pin 91 is indicated at 91a and this axis is also disposed with respect to the horizontal plane 72 at about 88½°. Since I have arranged the shear so that the reciprocation takes place upon a limited angular movement of the lever about 22, the movement of the shear blade is substantially in a straight line. It is to be understood that the shear blade may be inclined at angles other than 88½° and that I have merely indicated an angle employed in one operative embodiment of my invention for purposes of illustration.

The circles indicated at 101 and 102 about the cam shaft 6 indicate the throw of the lever 21 by the shear cam 25 and this throw is proportioned with respect to the distance between the stock feed line 70 and the plane 72 of the blank working dies to carry the sheared blank 27 into the plane 72.

During each complete rotation of the crankshaft or cycle of the machine the axis of the shearing quill carried by plate 81 is lowered into a position on the line 70 and the rod or wire stock 11 advanced along said line into the shearing quill and against the stock gauge 92. Thereafter the shear lever 21 is rocked by the cam 25 to raise the shearing means and shear the blank 27 from the main body of the stock. The upward shearing movement is continued until the blank is brought into the plane indicated by line 72 and is ejected at this point by a knockout 94 into a pair of co-operating transfer fingers carried by the carriage 40.

The knockout 94 is normally withdrawn from the shear opening by a coil spring in a manner familiar to those skilled in the art. The end of the knockout remote from the shear projects forwardly through the bed frame and is operatively associated thereat with the die knockout mechanism. Referring particularly to Figure 10, a knockout lever 96 is journalled between a pair of vertically spaced bosses 99 on the bed frame by pin 98 so as to extend laterally from its pivotal mounting and overhang the projecting end of the shear knockout 94. The free end of the knockout lever 96 is operatively associated with a projection 97 which extends laterally from the end of the knockout lever 34 arranged to actuate the knockout 33 of the fabricating die 30. This construction provides that as the sheared blank reaches the plane 72 of the working dies and nears the end of the ejecting stroke in the working dies the lever 96 is actuated to eject the blank from the shear into a pair of fingers on the transfer carriage 40.

It will be understood by reference to the Clouse Patent No. 2,026,823 that the transfer carriage 40 is provided with a number of pairs of transfer fingers which are adapted to simultaneously receive blanks ejected from equally spaced dies and transfer said blanks to the next adjacent dies so that each blank may be successively worked in each die.

In accordance with the disclosure of my said prior patent on the transfer mechanism the carriage 40 is reciprocated transversely of the die breast by a crank and pitman assembly. The opening and closing of the transfer fingers is accomplished by a separate drive. In the machine of this application the carriage reciprocation is accomplished by a crank and pitman assembly indicated as at 41, the crank being oscillated through 180° by a vertically mounted shaft 42 having a bevel gear connection as at 44 with a stub shaft 45, which in turn is provided with a fan gear 46 inside of the wall of the bed frame (see Figures 1 and 4). The fan gear is oscillated by a rack, cam and lever assembly 47 in which the cam is rotated by a stub shaft 48 geared in a one-to-one ratio to the main crankshaft of the machine. A similar cam and lever assembly 49 oscillates a cam shaft 43 which in turn actuates a vertically reciprocating rod 36 which controls the opening and closing of the transfer fingers.

Preferably the cam and lever arrangements 47 and 49 and their associated driven parts are connected to the transfer to effect transfer movements substantially as indicated in the timing diagram of Figure 11 so as to advance a sheared blank to the first fabricating die 30 and transfer previously fabricated blanks along through the line of dies 31 and 32. The transfer is coordinated with the stock shearing mechanism so that as a sheared blank is ejected from the shearing quill by the ejector 94 it will be advanced into a pair of waiting transfer fingers. The operation of the transfer drive and shearing drive insures that no shock resulting from the shearing or breaking of the stock will be transmitted to the transfer mechanism. The arrangement of transfer and shearing mechanism which I have provided has a further advantage in that the shear movement may vary with respect to header slide movement and that the shear mechanism need not dwell during the header slide advance and depend upon a header slide tool to remove the sheared blank from the shearing means. As will be observed from the timing diagram of Figure 11 the shear quill may be in a lowered stock receiving position as the header slide moves to its forward position. In numerous prior art constructions the shear mechanism transferred the sheared blank to the first work station and although said prior art arrangement possessed certain advantages the arrangement which I have provided in the instant application permits considerable variation in the distance through which the shear operates and the speed with which it moves during shearing action.

Referring back to the preferred form of shearing quill I have found that the sheared blanks having their end faces normal to the longitudinal axis of the blank may be produced by adjusting the shear mechanism so that the quill portion 83 is slightly below the stock feeding aperture of die 71. Upon a reciprocation of the stock feed connecting rod 55 the stock 11 is advanced into the machine, the end thereof contacts the rounded forward edge of the semi-cylindrical aperture in quill part 84 and the advancing movement of the stock through the quill forces the movable half 84 of the quill upwardly into abutment with the shank 88 of the abutment screw 87. The lever 21 is now rocked by cam 25 to elevate the shearing mechanism and thus the quill portion 83 is in motion when it strikes the lower edge of the unsheared blank.

Numerous structural differences of the shearing mechanism which I have provided contribute toward the production of straight uniform blanks having end faces substantially normal to the axis of the blank, which blank characteristics result in more perfect uniform finished headed articles. To emphasize the advantages of the present shear a reference is made to conventional shearing mechanisms found in the prior art wherein a shearing blade is moved transversely to advance rod or wire stock blanks to the fabricating dies. Where a knife edge is pressed against one side of a projecting length of stock, the stock tends to bend and the bending thereof is dependent upon numerous variables, such as, for instance, the material of the stock, the clearance between the knife and the stock feed die, the speed at which the knife moves and the diameter of the stock. Ordinarily in the conventional knife shear the stock tends to bend and break simultaneously on two oppositely curved shearing planes and this results in the formation of a leaf or island which tends, as a result of the shearing action, to adhere more or less to the blank or the rod stock in the bed frame die. Under certain conditions the leaf or "island" above referred to may be joined to the rod stock and thus form a part of the head of the next blank or be secured to the blank and thus form the shank tip of the sheared blank. Where the leaf or island becomes a part of the upset head of a bolt blank or, the like the head may have a fracture or defect in its top face caused by the addition of the leaf. Occasionally the cutter knife in the conventional shear may be adjusted so as to cut through the island or leaf resulting from shearing strains and thus both the tip of the shank and the head end of the blank have objectionable laminations or fracture sections therein, or chips resulting from the cutting of the island may drop free of the blank and cause excessive wear or jamb moving parts of the machine.

I have found that by constructing and arranging a shear according to my present invention that the blanks shear uniformly without the formation of a leaf, island or other objectionable fracture planes at the end faces. This acceptable uniformly sheared blank is undoubtedly due in part to the fact that both the solid shearing quill of Figure 8 and the two-part shearing quill of Figure 6 limit the bending of the blank. The fact that the shear blade mechanism in its entirety is tilted toward the stock feed die in the bed frame and moves through a short distance permits an adjustment and maintenance of the shearing quill snug against the inclined face of the stock feed die in the bed frame.

Among the common or characteristic defects of blanks sheared from rod or wire stock is that known in the art as "the drag" which appears to be caused by the failure of the longitudinal fibers to break clean or square in the shearing plane. The end face of a blank having the common "drag" defect is characterized by the longitudinal fibers at one side of the blank being bent or turned inwardly toward the center of the blank and the longitudinal fibers at the other side of the blank projecting downwardly slightly below the lower side of the blank. This normally results in a blank having a greater volume of metal below its central axis than thereabove with the consequence that when such a blank is upset to form a head the metal available to form the head is unevenly distributed and it is difficult to "fill" out the head into a full hex shape.

It will be understood that in shearing blanks according to my invention; that is, shearing blanks with an apparatus wherein the shear blade is tilted at an angle with respect to the longitudinal axis of the stock, provision is automatically made to compensate for the "drag". In other words, by arranging the shear at an angle to the axis of the stock extra metal is provided at the upper side of the shear blade to compensate for the axial shortening tendency of the "drag" effect and at the lower side of the blank a reduction in blank metal is made to compensate for the increase in blank stock thereat occasioned by the "drag" effect. As a result of shearing according to my invention a sheared blank is produced in which substantially equal volumes of metal are arranged above and below the longitudinal axis of the blank and a well filled upset head is obtainable therefrom.

As heretofore pointed out the shearing blade assembly may be moved at a high speed through a short distance during a cycle of the machine and the high speed of the shearing blade in combination with a shearing quill surrounding the sheared blank co-operate to produce a shearing plane substantially normal to the axis of the blank. Since the sheared stock is substantially surrounded by the shearing quill the high speed of operation of the shearing blade cannot throw the blank out of the shear such as would be the case if a conventional single knife edge shear blade were operated at a high speed. Since the shear blade moves such a short distance and does not carry the blank the full distance into position in alignment with a fabricating die, the angularity of the blade does not hinder the movement or alignment of the sheared blanks. The transfer mechanism employed according to my prior Patent No. 2,026,823 centers the blank properly upon receiving the same as it is ejected from the shear and accurately aligns the blank with the first fabricating die.

The operation of a cycle of a bolt heading or bolt making machine embodying my invention comprises a rotation of the crankshaft which rotates the eccentric 50 thereon projecting from the side of the bed frame and the rotation of this eccentric through strap 51 causes a reciprocation of the stock feed connecting rod 55. The reciprocating movement of rod 55 is converted through the overrunning clutch 19 to a rotary movement of the feed rolls 13 and 14. By reference to the timing diagram of Figure 11 it will be observed that the forward feed of the stock 11 is occasioned by the rotation of rolls 13 and 14 is timed with respect to the shear and header slide movements so that the shearing quill is in its lowered position in alignment with the advancing stock. As the rotation of the crankshaft continues the forward feed of the stock is discontinued and the reciprocation of the shear connecting rod 52 is converted through cam 25 to a vertical reciprocation of the shear means 20. As heretofore described the vertical movement of shear means 20 terminates in the plane 12 of the working dies and when in this plane the blank is ejected into the waiting transfer fingers mounted on carriage 40. By continued rotation of the crankshaft the shear means is lowered to receive advancing stock while the transfer fingers move the sheared blank into the first die 30 where the first blank working operation is carried out by the header slide tool.

In connection with the above described operation it will be observed that a single eccentric 50 and strap means 51 accomplishes through associated means 52 and 55 a forward feeding of the stock and a shearing of the stock in timed relation to each other and that the connecting rods 52 and 55 are placed in tension to accomplish their respective functions. This permits the construction of a bolt heading machine in which the bed frame is free of longitudinally extending rotating shafts, beveled gearing and attendant expensive bed frame machining operations. It is particularly pointed out that the maximum shearing load identified in Figure 11 by the words "cut off" occurs approximately 20° of crankshaft rotation prior to the application of the maximum knockout load and thus the single eccentric 50 and strap 51 may be proportioned to carry the maximum load of either the knockout or cut off mechanism. A single means (50—51) is thus provided to transmit the knockout, the shearing and the stock feed loads from the crankshaft to the respective knockout, shearing and stock feed mechanism. Since the loads referred to occur at intervals timed with respect to each other during a cycle of the forging machine they are not superimposed upon each other through the means 50—51 and said means may be proportioned to transmit only the greatest of said loads.

Although I have shown and described my invention in considerable detail, it will be understood by those skilled in the art that numerous variations and modifications may be made therein without departing from the scope of the invention as defined in the following claims.

I claim:

1. A machine for making bolts and the like having a header slide mounted to reciprocate therein, a crankshaft extending transversely of the machine and connected to said header slide to drive the same, an eccentric fixed to said crankshaft, a cam shaft mounted on the forward end of said machine having the axis thereof extending transversely of the machine, a knockout shaft arranged parallel to said cam shaft provided with arms operatively associated with cams carried by said cam shaft, a stock shearing mechanism arranged within said machine operatively associated with cam means carried on said cam shaft and a longitudinally extending reciprocating connecting rod arranged intermediate said crankshaft eccentric and said cam shaft to actuate said knockout shaft and said shear means in timed relation to header slide movements.

2. A machine for making bolts and the like comprising a bed frame having a longitudinally reciprocating header slide arranged therein, a crankshaft extending transversely of said machine to drive said header slide, an eccentric mounted on an outer wall of said machine operatively connected to said crankshaft, a strap surrounding said eccentric, a stock feed mechanism mounted to advance wire or rod stock into the machine and a shear mechanism arranged within said machine to cut off measured lengths of stock advanced by said mechanism, a pair of longitudinally reciprocating connecting rods connected to said eccentric strap to actuate said stock feed mechanism and said shear means in timed relation to each other and in timed relation with respect to said header slide movements.

3. In a machine for making bolts or the like comprising a bed frame having a reciprocating header slide and a crankshaft arranged to drive said header slide, an eccentric secured to said crankshaft, a stock feed mechanism mounted on said machine, a shear means arranged within said machine to cut blanks from the stock advanced by said mechanism, co-operating bed frame and header slide dies mounted in alignment with each other to work said blanks, a knockout within said bed frame die to eject said blanks subsequent to their working therein, a cam shaft, means carried by said cam shaft to move said knockout, a pair of longitudinally extending connecting rods connecting said mechanism and said cam shaft to said eccentric to successively effect an advance of rod or wire stock by said feed mechanism, a shearing of said stock by said shear means, a working of the sheared blank by said co-operating dies and an ejecting of the sheared blank from the bed frame die.

4. A machine for making headed articles including a feed mechanism and a shearing means, a longitudinally reciprocating header slide driven by a crankshaft extending transversely of said machine, said crankshaft proportioned to project at one end beyond an outer wall of said machine, an eccentric secured to said projecting end provided with a surrounding eccentric strap, reciprocating rods disposed along said outer wall operatively connecting said feed mechanism and shearing means to said eccentric strap to successively advance rod or wire stock into said machine and shear off measured lengths thereof in timed relation to header slide movements.

5. In a machine for making bolts or like headed articles, a bed frame, a reciprocating header slide driven by a crankshaft, a single eccentric means carried by said crankshaft at one side of said bed frame, a stock feed mechanism, a stock shearing mechanism, a pair of connecting rods each having one end thereof connected to said eccentric means, the other ends of said rods being connected to said stock feed mechanism and stock shearing mechanism respectively, said rods operable upon said stock feeding mechanism and stock shearing means to successively advance wire or rod stock and cut off measured lengths thereof in timed relation to said header slide movements.

6. A machine for making bolts or like headed articles comprising a bed frame, a longitudinally reciprocating header slide, a crankshaft mounted in said frame transversely of said header slide and operatively connected to said header slide to effect reciprocation of same, an eccentric carried by said crankshaft, a stock feeding mechanism, a stock shearing means, a longitudinally extending connecting rod operatively connected at one end thereof to said shearing means and provided with a strap at the other end thereof surrounding said eccentric, a longitudinally extending connecting rod operatively connected to said stock feeding mechanism and to said strap to successively advance wire or rod stock into said machine and cut off said stock in timed relation to header slide reciprocation.

7. A machine for making bolts or like headed articles comprising a bed frame, a longitudinally reciprocating header slide, a crankshaft mounted in said frame transversely of said header slide and operatively connected to said header slide to effect reciprocation of same, an eccentric carried by said crankshaft, a stock feeding mechanism, a stock shearing means including a cam, a longitudinally extending connecting rod operatively connected to said cam at one end and provided with means at the end thereof surrounding said eccentric, a longitudinally extending connecting rod operatively connected to said stock feeding mechanism at one end thereof and connected to said first named connecting rod at the other end thereof to drive said stock feed mechanism through said first named connecting rod, at least one of the connections on said last named connecting rod provided with an adjusting device to vary the magnitude of movement of the stock feed connecting rod with respect to the magnitude of movement of the first named connecting rod.

8. A machine for making bolts or like headed articles having a crank shaft, a longitudinally reciprocating header slide, a stock feed mechanism to advance rod or wire stock during each cycle of machine operation, a shear means mounted within said machine to cut off measured lengths of stock during each cycle of said machine comprising a transversely extending cam shaft operatively connected to said crankshaft and driven thereby, a shear lever pivotally mounted on said machine having one end thereof in operative engagement with a shear cam on said cam shaft, a vertically reciprocating shear blade assembly secured to said lever at a point spaced from said pivotal mounting thereof, said shear cam proportioned and arranged with respect to said stock feed mechanism to raise said shear blade assembly and cut off a length of stock subsequent to advancement of said stock by said stock feeding mechanism during each cycle of said machine.

9. A machine having a bed frame and a shear mechanism comprising, a cam shaft extending transversely of said bed frame, a shear cam secured to said shaft, a shear lever rotatably mounted upon an axis generally parallel to the axis of said cam shaft, one end of said shear lever in operative engagement with said shear cam, a shear movable blade assembly operatively connected to the other end of said shear lever, means to guide said shear blade, means to oscillate said cam shaft whereby said shear lever is rocked on its pivotal mounting and said shear blade is reciprocated in said guide means.

10. A machine for making bolts or like headed articles comprising a bed frame having a plurality of aligned dies therein, a reciprocating header slide having a plurality of aligned dies arranged to co-operate with said bed frame dies to successively work a series of bolt blanks, a transfer means arranged adjacent said line of bed frame dies to successively transfer bolt blanks subsequent to the working thereof in each of said dies, means to advance rod or wire stock into said machine along a line below the plane of said aligned dies, a vertically movable shear means to cut off lengths of said advanced rod or wire stock and move the same upwardly into the plane of said dies, an ejector provided to eject the sheared blank from said shear means into said transfer to permit a transfer of the sheared blank horizontally to an adjacent bed frame die.

11. A machine for making bolt blanks or like headed articles comprising a bed frame provided with a longitudinally reciprocating header slide, a crankshaft to drive said header slide, co-operating bed frame and header slide tools to work bolt blanks, a knockout assembly to eject bolt blanks worked in said bed frame dies including pivoted knockout levers operatively associated with knockout cams, a cam shaft mounted to oscillate and move said cams and levers, a shear mechanism within said machine to shear off lengths of blank stock comprising a reciprocating shear blade pivotally secured to a rocking shear lever, a shear cam secured to said cam shaft and means on said shear lever engaging said shear cam to effect shear blade reciprocation, a shear ejector arranged to eject a sheared blank from said shear blade at one end of said blade's reciprocation and means on said knockout assembly operatively connected to said shear ejector to advance the same into said shear blade.

12. In a machine for making bolt blanks or the like, a series of spaced aligned solid dies for effecting different fabricating operations upon a bolt blank, a stock entrance dies spaced from the plane defined by said aligned dies, a reciprocating shear blade arranged to receive stock advanced through said entrance die, shear a blank from said stock and move the sheared blank into said plane, a reciprocating transfer mechanism having co-operating transfer fingers thereon to transfer the sheared blank from the shear blade to the first die of said series and simultaneously transfer previously sheared blanks along said series of aligned dies.

13. In a machine for making bolt blanks or the like, a series of spaced aligned dies for effecting different fabricating operations upon a bolt blank, a stock entrance die spaced from the plane defined by said aligned dies, a reciprocating shear blade arranged to receive stock advanced through said feeding die, shear a blank from said stock and move the sheared blank into said plane, a shear ejector timed to eject the sheared blank from the blade in said last named position and a transfer carriage having co-operating transfer fingers thereon arranged to transfer said sheared blank upon its ejection from said blade to the first die of said series and simultaneously transfer previously sheared blanks along said series of dies.

14. A shearing mechanism for rod or wire stock comprising an oscillating cam shaft, a cam secured to said shaft, a stock feeding die and means to intermittently advance stock therethrough, a shear lever pivotally mounted upon an axis generally parallel to said cam shaft, one end of said lever operatively engaging said cam, a shear blade pivotally connected to the other end of said lever, said blade having a shear quill aperture adapted to be moved into and out of alignment with said stock feeding die to receive stock advanced therethrough and cut off the stock by moving with respect to the die.

15. In a machine for making bolts or the like, a stock feeding mechanism mounted to advance stock horizontally into said machine through a stock entrance die, a shear blade mounted for vertical reciprocation within said machine, said blade having a shearing quill therein adapted to surround rod or wire stock advanced by said feed mechanism at one end of shear blade reciprocation, and means to move said shearing blade comprising a lever pivotally mounted upon the bed frame of said machine, a cam mounted to move with respect to said lever and the bed frame of said machine operatively engaging one end of said lever, the lower end of said reciprocating shear connected to said lever and means to move said cam to reciprocate said shear during each cycle of the machine movement.

16. A machine for making bolt blanks or the like comprising a stock feeding means arranged to advance stock longitudinally into said machine, means for shearing off measured lengths of advanced stock within said machine, said last named means comprising a lever pivoted intermediate its ends upon the bed frame of the machine and extending generally longitudinally of the machine, the forward end of said lever shaped to provide a pair of spaced cam roller supports, a cam shaft arranged transversely of the machine adjacent said cam roller supports provided with opposed cam surfaces, one of said cam surfaces operatively engaged with one cam roller of said pair and the other cam surface operatively engaged with the other cam roller of said pair, a shear blade assembly arranged to reciprocate transversely of the direction of stock advance and shear off stock advanced by said stock feeding means, one end of said shear blade assembly connected to said lever.

17. A shearing mechanism comprising a reciprocating shear blade, a die arranged to feed stock into said blade at one end of its reciprocation, said blade provided with a shearing quill including a semi-cylindrical stock embracing portion fixed with respect to the blade and a complementary semi-cylindrical stock embracing portion movable with respect to the blade.

18. A shearing mechanism comprising a reciprocating shear blade, a die arranged to feed stock into said blade at one end of its reciprocation, said blade provided with a shearing quill formed of a pair of solid complementary stock embracing parts, one of said parts fixed with respect to said blade and the other of said parts mounted for limited bodily movement with respect to said blade.

19. A shearing blade for rod or wire stock having an aperture therein to receive complementary shearing quill parts, one of said shearing quill parts fixed with respect to said blade and having a semi-circular opening therein to embrace one half of the rod or wire stock, the other part of said quill having a semi-circular recess therein arranged to embrace the other half of said wire or rod stock mounted to move with respect to the said one quill part and a spring carried by the blade normally urging said other quill part into engagement with said one quill part.

20. In combination, a stock feeding die and means to feed stock intermittently through said die, a shearing blade provided with a shearing quill arranged to reciprocate with respect to said die and cut off wire or rod stock advanced through said die, said quill comprising a lower half fixed to said blade and an upper half movable with respect to said blade, each of said quill halves provided with a semi-cylindrical cut-out to embrace or surround wire or rod stock advanced therein, the cylindrical cut-out of the upper half of the quill being provided with a rounded edge on the face thereof adjacent the stock feeding die whereby said quill part may be moved away from the other quill part by the advancement of stock into the quill.

21. A shearing mechanism comprising a blade having an aperture shaped to receive a pair of complementary quill parts, one of said quill parts being secured to said blade and the other of said quill parts movable with respect to said blade, an adjusting means carried by said blade to limit the movement of said other quill part.

22. A shearing mechanism for bolt making machines and the like comprising a stock feeding die carried by the bed frame, a shear blade arranged to move transversely with respect to the axis of said stock feeding die, said blade provided with a shearing quill apertured to surround wire or rod stock advanced through said stock feeding die, said quill including a portion fixed with respect to the blade and a portion having a limited movement with respect to said blade, a spring normally urging said last named portion and an adjusting screw to limit the movement of said last named portion away from said first named portion.

23. In a machine for making bolts or like headed articles, a die breast having a plurality of blank shaping dies therein, a stock feeding die in said die breast spaced from said first named dies, a header slide arranged to reciprocate in the bed frame of said machine carrying tools co-operating with said bed frame dies, means to intermittently advance stock through said stock feeding die in timed relation to header slide movements, means to cut blanks from stock advanced through said stock feeding die comprising a reciprocating shear blade assembly having a cutting edge adapted to be aligned with said stock feeding die at one point during its reciprocation, means to reciprocate said blade including a lever pivoted intermediate its ends in the bed frame of said machine and extending generally in the direction of the stock feed through said stock feeding die, one end of said lever operatively connected to a cam moving in timed relation to header slide movements, the other end of said lever connected to one end of said shear blade assembly to move said end of the shear blade assembly through an arc, the other end of said shear blade assembly provided with means to guide said end in a substantially straight line reciprocation.

24. In a machine for making bolts or like headed articles, a planar die breast provided with a stock feeding die, means to advance stock intermittently through said die and means to cut off blanks from said advanced stock comprising a movable shear blade assembly inclined with respect to the plane of said die breast to apply the shearing force at an angle to the plane of the die breast and means to reciprocate said shear blade assembly.

25. In a machine for making bolt blanks or the like, a die breast provided with a series of spaced forming dies arranged in a horizontal plane, a stock feeding die spaced from the said plane of said forming dies, a cut off mechanism arranged to reciprocate in a vertical line to shear stock advanced through said feeding die and move the same into the plane of said forming dies.

26. In a machine for making bolt blanks or the like, a die breast provided with a series of spaced forming dies arranged in a horizontal plane, a stock feeding die spaced from the plane of said forming dies, a cut-off mechanism inclined with respect to said die breast to apply a shearing force at an angle to said stock feeding die whereby a component of said force tends to hold the cut-off mechanism against said die during the shearing, said mechanism mounted to reciprocate in a plane normal to the plane of said forming dies to shear blanks from stock advanced through said feeding die and move the sheared blanks into the plane of said forming dies.

27. A machine having a bed frame, a shear mechanism comprising a cam shaft extending transversely of said bed frame, a shear cam secured to said shaft, a shear lever rotatably mounted upon an axis generally parallel to the axis of said cam shaft, one end of said shear lever in operative engagement with said shear cam, a movable shear blade assembly operatively connected to the other end of said shear lever, means to oscillate said cam shaft whereby said shear lever is rocked on its pivotal mounting and said shear blade is reciprocated.

28. In a machine for making bolts or like headed articles having a bed frame provided with a longitudinally reciprocating header slide, a stock feeding mechanism and a shearing mechanism, the combination of a stock feeding die arranged to advance stock into said machine in a direction parallel to the movement of the header slide and a shear blade arranged to move transversely of said stock feeding die and at an angle other than normal to the axis of the advancing stock to cut off blanks having substantially the same volume of metal on the end faces thereof at all sides of the longitudinal axis of the blank.

29. In combination, a stock feeding mechanism arranged to advance rod or wire stock horizontally into a machine, a fabricating die disposed in a horizontal plane spaced from the horizontal plane of said advancing stock, a shearing mechanism including a member reciprocable substantially in a vertical line mounted to cut off lengths of advanced rod or wire stock and move the same into the plane of said fabricating die and an ejector arranged to eject the cut off blank from said member in the same direction as said stock advances in the plane of said fabricating die.

30. In a machine for making bolt blanks or the like, co-operating bed frame and header slide dies arranged to effect a shaping of a bolt blank, a stock entrance die spaced from the plane of said co-operating dies, a shear blade reciprocable substantially in a substantially vertical line and arranged to receive stock advanced through said entrance die, shear a blank from said stock and move the sheared blank into the plane of said co-operating dies at a position offset laterally from the first of said dies and a reciprocating transfer mechanism having co-operating transfer fingers thereon to transfer the sheared blank from the shear blade into alignment with said co-operating dies.

31. In a machine for making bolt blanks or the like, co-operating bed frame and header slide dies arranged to effect a shaping of a bolt blank, a stock entrance die spaced from the plane of said co-operating dies, a shear blade reciprocable substantially in a vertical line and arranged to receive stock advanced through said entrance die, shear a blank from said stock and move the sheared blank into the plane of said co-operating dies, an ejector mechanism arranged to move the sheared blank out of said shear blade, and a reciprocating transfer mechanism having co-operating transfer fingers thereon to receive the ejected sheared blank and move the same into alignment with said co-operating dies.

32. A shearing mechanism for rod or wire stock comprising a bed frame, a cam movably mounted thereon, a stock feeding die in said bed frame and means to intermittently advance stock therethrough, a shear lever having a part thereof in operative engagement with said cam, a shear blade pivotally connected to said lever and arranged to be moved into and out of alignment with said stock feeding die to cut off lengths of stock advanced therethrough.

33. In a machine for making bolts or the like, a bed frame, a stock feeding die in said bed frame and means to intermittently advance rod or wire stock therethrough, a shearing mechanism for said rod or wire stock comprising a cam movably mounted on said bed frame, a pivoted shear lever mounted to operatively engage said cam and a shear blade mechanism pivotally secured to said lever and mounted to reciprocate into and out of alignment with said stock feeding die in response to cam actuated lever movement.

34. A shearing blade for rod or wire stock having an aperture therein to receive complementary shearing quill parts, one of said parts fixed with respect to said blade and arranged to engage one side of the rod or wire stock advanced therein, the other of said parts mounted for movement in its entirety with respect to said blade and arranged to engage the opposite side of said wire or rod stock and a spring normally urging said movable part with respect to the fixed part to resiliently grip the sheared blank subsequent to the shearing thereof.

35. A machine for making bolts or the like comprising a bed frame having a stock feed die therein arranged to guide rod or wire stock advanced into the machine, a shear blade mounted to reciprocate transversely of said die and cut off lengths of said advancing stock, said blade mounting including means to tilt the shear blade with respect to the die and apply the shearing force to said blade at a point spaced from the face of the die whereby a component of the shearing force acts to hold the blade against the face of the die.

36. A machine for making bolts or the like, including a bed frame having a stock feed die to guide advancing rod or wire stock into said machine, said die provided with a shearing face, a shearing mechanism comprising a shearing lever pivoted on the bed frame and having a portion thereof projecting beyond said shearing face, a reciprocating shear blade operatively secured at one end to said projecting portion and bearing against said shearing face, the point of application of force from said lever to said blade being spaced beyond said shearing face whereby the shearing force is applied at an angle to said face and a component of said force tends to hold the blade against said face during shearing of the stock.

37. In a machine for making bolts and the like, a bed frame, a header slide mounted to reciprocate therein, a crankshaft arranged to reciprocate said header slide having an eccentric carried thereby adjacent one side of the bed frame, a cam shaft mounted on the bed frame with the axis thereof extending generally parallel to the axis of said crankshaft, shear means and knockout means arranged to be actuated by said cam shaft, and a single connecting rod operatively connecting said crankshaft eccentric and said cam shaft to actuate said shear means and knockout means in timed relation to header slide reciprocation.

38. In a machine for making bolts and the like, a bed frame, a crankshaft, a reciprocating header slide driven by said crankshaft, a stock feeding mechanism, a shear mechanism for cutting off lengths of stock, a connecting rod driving said shear mechanism, a connecting rod driving said feeding mechanism, and a single eccentrically rotatable driving member driven by said crankshaft driving both of said connecting rods.

39. In a machine for making bolts and the like, a bed frame, a crankshaft, a reciprocating header slide driven by said crankshaft, a stock feeding mechanism, a shear mechanism for cutting blanks from the stock, a solid die carried by said bed frame for receiving the cut off blanks, a tool carried by said header slide for working upon blanks held in said die, knockout mechanism for ejecting blanks from said die and a single eccentrically rotatable driving member driven by said crankshaft and driving all of said shear mechanism, said feeding mechanism and said knockout mechanism.

40. In a machine for making bolts and the like, a bed frame, a crankshaft, a reciprocating header slide driven by said crankshaft, a stock feeding mechanism, a shear mechanism for cutting blanks from the stock, and means for driving said feeding mechanism and said shear mechanism including an eccentrically rotatable driving member driven by said crankshaft and a connecting rod driven by said driving member, one of said mechanisms being driven by the longitudinal component of the movement imparted to said connecting rod and the other of said mechanisms being driven by the lateral component of the movement imparted to said connecting rod.

41. In a machine for making bolts and the like, a bed frame, a crankshaft, a reciprocating header slide driven by said crankshaft, a stock feeding mechanism, a solid die in said bed frame, a tool carried by said header slide for acting upon blanks held in said die, a knockout mechanism for ejecting blanks from said die, and driving means for said feeding mechanism and said knockout mechanism including an eccentrically rotatable driving member driven by said crankshaft and a connecting rod driven by said driving member, one of said mechanisms being driven by the longitudinal component of the movement imparted to said connecting rod and the other of said mechanisms being driven by the lateral component of the movement imparted to said connecting rod.

42. In a header or the like, shearing mechanism including a die through which stock is fed and a blade movable across the face of the die at an inclination to the plane perpendicular to the stock, said blade having a cutting edge immediately adjacent the die acting to bend and then sever the projecting end of the stock and said blade having a portion to contact the stock opposite the cutting edge at a point spaced from the edge of the die to limit the bending of the projecting end of the stock.

WILLIAM L. CLOUSE.